F. R. MATHER.
WHEEL.
APPLICATION FILED JAN. 31, 1908.
929,234.
Patented July 27, 1909.
2 SHEETS—SHEET 1.
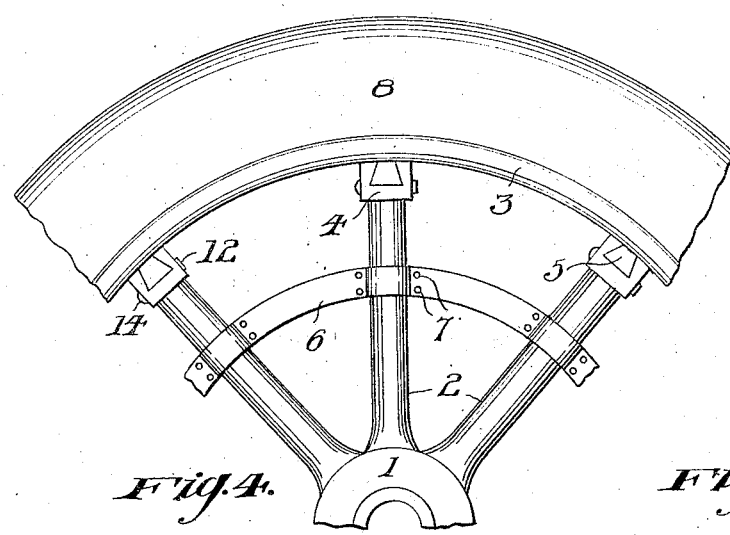
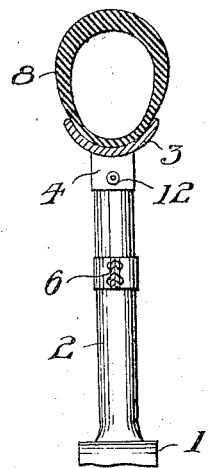
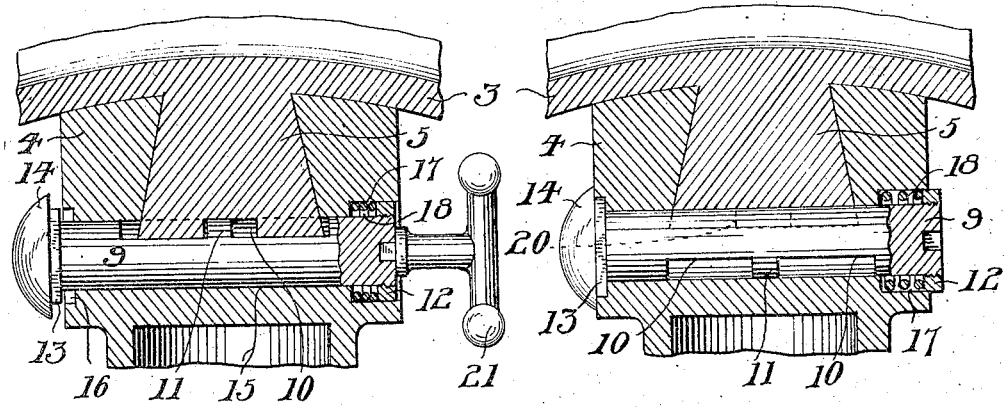
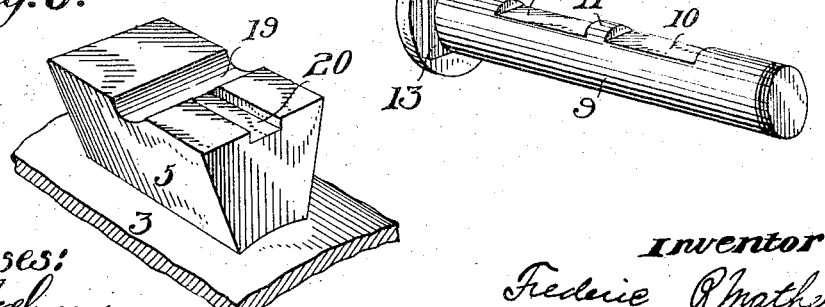
Witnesses:
Inventor
Frederic R. Mather
by W. G. Doolittle
Attorney

F. R. MATHER.
WHEEL.
APPLICATION FILED JAN. 31, 1908.

929,234.

Patented July 27, 1909.
2 SHEETS—SHEET 2.

Witnesses:

Inventor
Frederic R. Mather
by W. G. Doolittle
Attorney

UNITED STATES PATENT OFFICE.

FREDERIC R. MATHER, OF WHITESVILLE, NEW YORK.

WHEEL.

No. 929,234.  Specification of Letters Patent.  Patented July 27, 1909.

Application filed January 31, 1908. Serial No. 413,681.

*To all whom it may concern:*

Be it known that I, FREDERIC R. MATHER, of Whitesville, in the county of Allegany and State of New York, have invented certain new and useful Improvements in Wheels, of which the following is a specification.

The object of my invention is to provide a new and improved wheel having a detachable-rim particularly designed to receive a solid or pneumatic rubber tire and of such a construction that the rim together with the tire may be readily detached from and attached to the spokes of the wheel.

Figure 7:
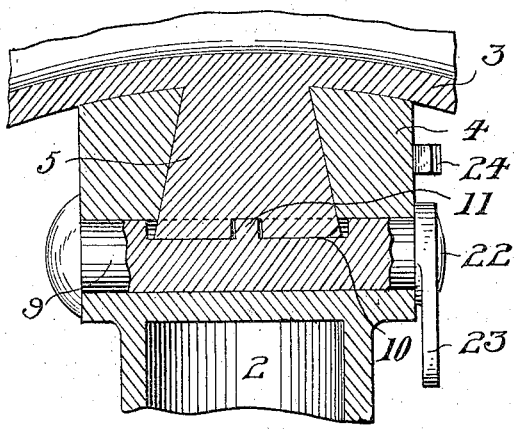
Figure 8:
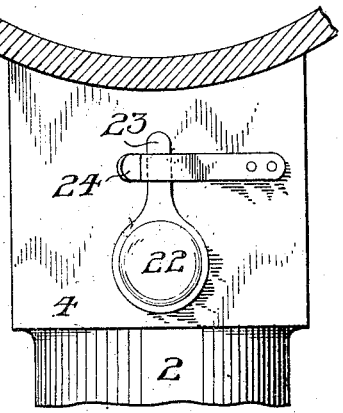
Figure 9:
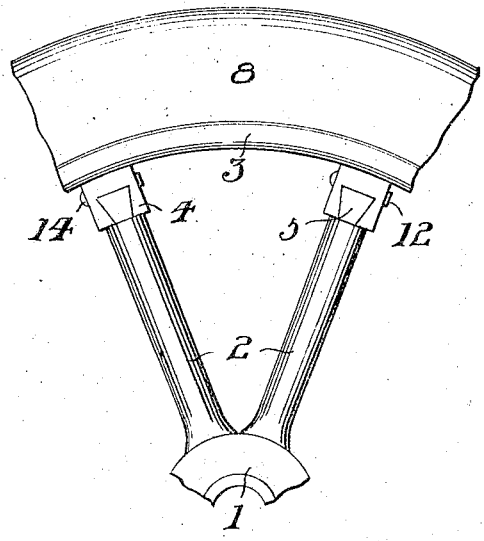
Figure 10:
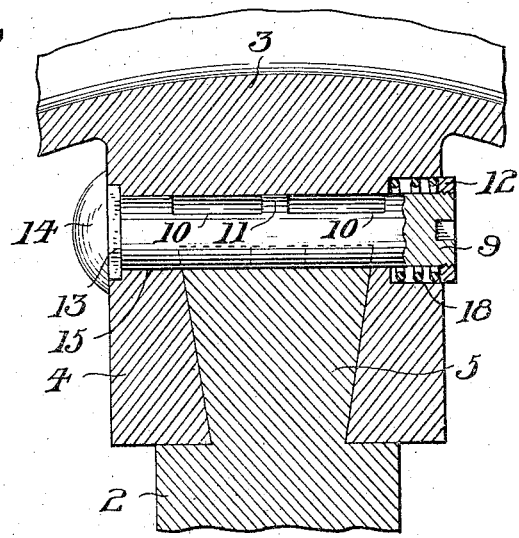

In the accompanying drawings, which illustrate applications of my invention, Figure 1 is a side elevational view of a portion of a wheel embodying my invention; Fig. 2 an elevational view of a spoke showing a part of the rim and tire in cross-section; Fig. 3 a vertical sectional view of a portion of the rim and a spoke particularly showing the preferred form of locking or securing means employed; Fig. 4 a similar view showing the bolt in different position from that shown by Fig. 3; Figs. 5 and 6 detail views of a bolt and a grooved engaging-member; Fig. 7 a vertical sectional view showing a modified form of construction; Fig. 8 a side elevational view partly in section of the form of Fig. 7; Fig. 9 a side elevational view of a still further modified construction; and Fig. 10 a vertical sectional view of the form of Fig. 9.

Referring to the drawings and first to the form of Fig. 1, 1 designates a hub, 2 the spokes, and 3 a detachable rim of a wheel. As illustrated, each spoke at its outer end is formed with a receiving-member 4 adapted to receive a dove-tailed projecting engaging-member 5. In the construction shown, the receiving-member 4 is formed integral with a spoke and the engaging-members 5 integral with the rim, but, if desired, these parts 4 and 5 may be separable and suitably attached respectively to the spokes and to the rim proper. The spokes as well as the rim, may be made of metal or wood or of other suitable material or materials.

The engaging-members 5 are preferably of the dove-tailed form as shown and correspond in number with the number of spokes.

Between the hub and the rim, I preferably employ a strengthening-band 6 made of two strips and secured together over the spokes by rivets 7.

8 designates a pneumatic-tire fitted into the detachable-rim.

The detachable-rim is applied to the spokes by entering the dove-tailed engaging-members 5 into the dove-tailed receiving-members 4.

The means for securing or locking the detachable-rim to the spokes of the wheel and for unlocking the same in order to permit the rim to be readily removed from the spokes, constitute characteristic and important features of the present invention. These means comprise a novel form of bolt which is designed to coöperate with an engaging-member, and with a receiving-member to lock and unlock said rim to and from the spokes. The bolt 9 is provided with a divided cutaway-portion 10, said portion being divided by a strengthening rib or projection 11, with an annular collar 12, a square shouldered flange 13, and a head 14. Each of the receiving-members 4 is formed with a laterally extending opening 15. This opening is enlarged at its respective ends as shown at 16 and 17. Opening 15 is adapted to receive bolt 9 and the said enlargements 16 and 17 to respectively receive the flange 13 and the collar or flange 12 of the bolt. 18 designates a coiled spring located in the said enlargement 17 and arranged to bear against the inner face of the annular flange 12. Each engaging-member 5 is formed with a groove 19 and with a groove 20, the latter being at right angles with groove 19.

When the parts are assembled and locked they assume the position shown by Fig. 3, that is, with a curved portion of the bolt 9 located in the groove 19 of the engaging-member. To unlock the parts the bolt 9 is shoved inwardly, by any suitable tool, as, for example, a tool 21 shown by Fig. 4, until the square-shouldered flange 13 is free of the walls of the opening 16, then the bolt is given a half turn, which turning brings the cutaway portion uppermost or into the position shown by Fig. 4. The pressure upon the tool is then stopped and the spring 18 moves the bolt laterally with its cutaway portion located in the grooves 19. In this position, the groove 20 will register with the rib or lug 11. This operation is performed with respect to each spoke, after which the rim may be detached from the spokes by sliding the engaging-members free from their respective receiving-members.

The rib 11 is employed to give strength to the bolt at its cutaway portion but may be dispensed with, if desired. When said rib 11 is not employed it will not be necessary to form the groove 20 in the engaging-members.

In the form of Fig. 7, I have shown a modified construction dispensing with the flanges on the bolt, the spring, and with the enlargements in the opening 15. In this form, the bolt 9 is provided with a head 22 and a short lever 23 by which the bolt is turned. Fig. 7 shows the bolt in an unlocked position, while Fig. 8 shows the position of the lever when the parts are locked. 24 designates a spring latch.

In the form of Fig. 9, I have shown the engaging-member 5 formed or attached to the spoke instead of on the rim as is the case in the forms of Figs. 1 and 7, and the receiving-member 4 formed on or attached to the rim.

What I claim is:

1. A wheel of the class described, comprising a series of spokes and a detachable-rim, means for locking the rim directly to the spokes comprising an engaging member formed with a groove, a receiving-member for the engaging-member, a bolt having a portion thereof located in the groove, a spring arranged to exert a lateral pressure on the bolt, said bolt provided with means to prevent the bolt from turning when the parts are locked.

2. A wheel comprising a hub and spokes, a detachable-rim adapted to hold a pneumatic tire, means for locking the rim directly to the spokes and unlocking the same, comprising an engaging-member formed with a groove, a receiving-member for the engaging-member, a bolt adapted to be turned in one direction to enter the groove to lock the parts, and in another direction to free it from the groove, a spring arranged to exert a lateral pressure on the bolt, and means to prevent the bolt from turning when the parts are locked.

3. A wheel comprising a hub and spokes, a detachable-rim adapted to hold a pneumatic-tire, means for securing the rim directly to the spokes and detaching the rim from the spokes comprising an engaging-member formed with a groove, a receiving-member, and a bolt passed through the receiving-member and adapted to be turned to enter the groove of the engaging-member to lock the parts and to be moved laterally and turned to free it from the groove.

4. A wheel comprising a hub and spokes, a detachable-rim, means for locking the rim to the spokes and unlocking the same, comprising an engaging-member formed with a main groove and a groove at right angles thereto, a receiving-member, and a bolt having a cutaway portion and a lug, said bolt adapted to be turned in one direction to enter the main groove and in another direction to bring the cutaway portion into register with the main groove and the lug into register with the other groove.

5. A wheel comprising a hub and spokes, a detachable-rim, means for securing and detaching the rim to and from the spokes comprising an engaging-member formed with a groove, a receiving-member having an opening extending through it, said opening being enlarged at one end, a bolt located in the opening and provided with a flange located in the enlarged portion of the opening, said bolt adapted to be turned to enter the groove and to free it from the groove.

6. A wheel comprising a hub and spokes, a detachable-rim, means for securing and detaching the rim to and from the spokes comprising an engaging-member formed with a groove, a receiving-member having an opening extending through it, said opening being enlarged at one end, a bolt located in the opening and provided with a flange located in the enlarged portion of the opening, a spring located in the enlarged portion of the opening, said bolt adapted to be turned to enter the groove and to free it from the groove.

7. A wheel comprising a hub and spokes, a detachable-rim, means for securing and detaching the rim to and from the spokes comprising an engaging-member formed with a groove, a receiving-member having an opening extending through it, said opening being enlarged at each end, a bolt located in the opening and provided with a flange at each end, said flanges each located in an enlarged portion of the opening, and a spring located in one of the enlarged portions, said bolt adapted to be turned to enter the groove and to free it from the groove.

In testimony whereof I affix my signature in presence of two witnesses.

FREDERIC R. MATHER.

Witnesses:
A. J. HALSEN,
L. C. ALLEN.